US012752585B2

(12) United States Patent
Akai et al.

(10) Patent No.: US 12,752,585 B2
(45) Date of Patent: Oct. 6, 2026

(54) SUSPENSION CONTROL DEVICE, SUSPENSION CONTROL METHOD, AND SUSPENSION CONTROL SYSTEM

(71) Applicant: Hitachi Astemo, Ltd., Hitachinaka (JP)

(72) Inventors: Akihito Akai, Tokyo (JP); Ryusuke Hirao, Hitachinaka (JP); Makoto Matsuura, Hitachinaka (JP)

(73) Assignee: Hitachi Astemo, Ltd., Ibaraki (JP)

( * ) Notice: Subject to any disclaimer, the term of this patent is extended or adjusted under 35 U.S.C. 154(b) by 34 days.

(21) Appl. No.: 18/566,211

(22) PCT Filed: May 12, 2022

(86) PCT No.: PCT/JP2022/020114

§ 371 (c)(1),
(2) Date: Dec. 1, 2023

(87) PCT Pub. No.: WO2022/264720

PCT Pub. Date: Dec. 22, 2022

(65) Prior Publication Data

US 2024/0253412 A1 Aug. 1, 2024

(30) Foreign Application Priority Data

Jun. 16, 2021 (JP) ................................ 2021-100428

(51) Int. Cl.
*B60G 17/018* (2006.01)
*B60G 17/0165* (2006.01)

(52) U.S. Cl.
CPC ....... *B60G 17/0165* (2013.01); *B60G 17/018* (2013.01); *B60Y 2400/86* (2013.01)

(58) Field of Classification Search
CPC .............. B60G 17/0165; B60G 17/018; B60Y 2400/86
See application file for complete search history.

(56) References Cited

U.S. PATENT DOCUMENTS 5,929,388 A 7/1999 Uehara et al.
11,505,023 B2 * 11/2022 Cho ........................ G06N 3/08
(Continued)

FOREIGN PATENT DOCUMENTS

CN 106828005 A 6/2017
DE 10 2020 210 665 A1 6/2021
(Continued)

OTHER PUBLICATIONS

German Office Action issued on Sep. 16, 2024 for German Patent Application No. 112022001793.7.
International Search Report, PCT/JP2022/020114, Jun. 28, 2022.

*Primary Examiner* — Gonzalo Laguarda
(74) *Attorney, Agent, or Firm* — Volpe Koenig

(57) ABSTRACT

A suspension control device includes: a parameter storage unit that stores a parameter indicating a correspondence between behavior information indicating behavior of a vehicle and sensor data related to a suspension of the vehicle, the parameter determined in advance by machine learning; a vehicle behavior inference unit that receives the behavior information among communication data transmitted in the vehicle and infers the sensor data related to the suspension of the vehicle based on the behavior information and the parameter in the parameter storage unit; and a control value calculation unit that calculates a suspension control value for controlling the suspension based on the inferred sensor data.

13 Claims, 11 Drawing Sheets

(56) References Cited

U.S. PATENT DOCUMENTS

| | | | | |
|---|---|---|---|---|
| 11,524,542 | B2 * | 12/2022 | Kim | B60G 17/01908 |
| 11,932,071 | B2 * | 3/2024 | Lee | B60G 17/0165 |
| 12,337,642 | B2 * | 6/2025 | Matsuura | B60G 17/0152 |
| 2004/0162644 | A1 | 8/2004 | Torii et al. | |
| 2009/0024270 | A1 | 1/2009 | Savaresi et al. | |
| 2016/0318364 | A1 | 11/2016 | Kanda et al. | |
| 2019/0344798 | A1 | 11/2019 | Motomura et al. | |
| 2021/0171050 | A1 * | 6/2021 | Han | G01M 17/04 |
| 2023/0271471 | A1 | 8/2023 | Yamahata et al. | |

FOREIGN PATENT DOCUMENTS

| | | | |
|---|---|---|---|
| DE | 11 2021 003 647 | T5 | 6/2023 |
| JP | H04-138970 | A | 5/1992 |
| JP | H06-286630 | A | 10/1994 |
| JP | H07-329534 | A | 12/1995 |
| JP | H09-244710 | A | 9/1997 |
| JP | H09-325065 | A | 12/1997 |
| JP | 2004-249812 | A | 9/2004 |
| JP | 2009-018800 | A | 1/2009 |
| JP | 2016-203920 | A | 12/2016 |
| JP | 2018-135068 | A | 8/2018 |
| JP | 2019-189228 | A | 10/2019 |

* cited by examiner

SUSPENSION CONTROL DEVICE, SUSPENSION CONTROL METHOD, AND SUSPENSION CONTROL SYSTEM

TECHNICAL FIELD

The present invention relates to a suspension control device, a suspension control method, and a suspension control system.

BACKGROUND ART

A known suspension control device controls an attitude of a vehicle by changing rigidity, characteristics, and the like of a suspension according to a road surface condition and a driving condition. The suspension control device controls the suspension by detecting sensor data from a sensor that detects piston speed and sprung acceleration of the suspension of four wheels of the vehicle. A suspension control device without a sensor has been considered.

PTL 1 describes a suspension control device without using an expensive sensor such as a stroke sensor, and when a value of the wheel speed variation detected by the wheel speed sensor becomes a prescribed value or more to a minus side by defining zero as a reference, control to increase the damping force is performed by regarding that a ground load of the wheel is reduced, and the damping force of the damping force variable damper provided in each of right and left front wheels is controlled on the basis of the state amount in the wheel having larger wheel speed variation of the right and left front wheels.

CITATION LIST

Patent Literature

PTL 1: JP 2019-189228 A

SUMMARY OF INVENTION

Technical Problem

In the device of PTL 1, the accuracy of suspension control according to the behavior of the vehicle is not sufficient.

Solution to Problem

A suspension control device according to the present invention includes: a parameter storage unit that stores a parameter indicating a correspondence between behavior information indicating behavior of a vehicle and sensor data related to a suspension of the vehicle, the parameter determined in advance by machine learning; a vehicle behavior inference unit that receives the behavior information among communication data transmitted in the vehicle and infers the sensor data related to the suspension of the vehicle based on the behavior information and the parameter in the parameter storage unit; and a control value calculation unit that calculates a suspension control value for controlling the suspension based on the inferred sensor data.

A suspension control method according to the present invention is a suspension control method in a suspension control device that controls a suspension of a vehicle, the suspension control method including: storing a parameter indicating a correspondence between behavior information indicating behavior of a vehicle and sensor data related to a suspension of the vehicle, the parameter determined in advance by machine learning; receiving the behavior information among communication data transmitted in the vehicle and inferring the sensor data related to the suspension of the vehicle based on the behavior information and the parameter; and calculating a suspension control value for controlling the suspension based on the inferred sensor data.

A suspension control system according to the present invention is a suspension control system including a server device and a suspension control device that controls a suspension of a vehicle, the suspension control system, in which the server device acquires behavior information indicating behavior of the vehicle and sensor data related to a suspension of the vehicle, and determines, by machine learning, a parameter indicating a correspondence between the behavior information and the sensor data, and the suspension control device acquires the parameter from the server device, receives the behavior information among communication data transmitted in the vehicle, infers the sensor data related to the suspension of the vehicle based on the behavior information and the parameter, and controls the suspension based on the inferred sensor data.

Advantageous Effects of Invention

According to the present invention, the accuracy of suspension control according to the behavior of the vehicle is improved.

DESCRIPTION OF EMBODIMENTS

Embodiments of the present invention will be described below with reference to the drawings. The following description and drawings are illustrative of the present invention and are omitted and simplified as appropriate for a clearer description. The present invention can also be carried out in various other forms. Unless otherwise specified, each component may be singular or plural.

When there are a plurality of components having the identical or similar functions, the identical reference sings may be given different suffixes for explanations. However, if the plurality of components do not need to be distinguished, suffixes are sometimes omitted for explanations.

The following description sometimes includes description of processing performed by executing a program. Executed by a processor (e.g., CPU or GPU), the program performs determined processing while using a storage resource (e.g., memory) and/or an interface device (e.g., communication port) as appropriate. Hence, the agent of the processing may be the processor. Similarly, the agent of processing performed by executing the program may be a controller, a device, a system, a computer, or a node having a processor. The agent of processing performed by executing the program is only required to be an arithmetic operation unit, and may also include a dedicated circuit (e.g., FPGA or ASIC) that performs specific processing.

The program may be installed to a device such as a computer from a program source. The program source may be, for example, a program distribution server or a computer-readable storage medium. When the program source is a program distribution server, the program distribution server may include a processor and a storage resource that stores a distribution target program, and the processor of the program distribution server may distribute the distribution target program to another computer. In the description below, two or more programs may be implemented as one program, or one program may be implemented as two or more programs.

First Embodiment

Figure 1A:
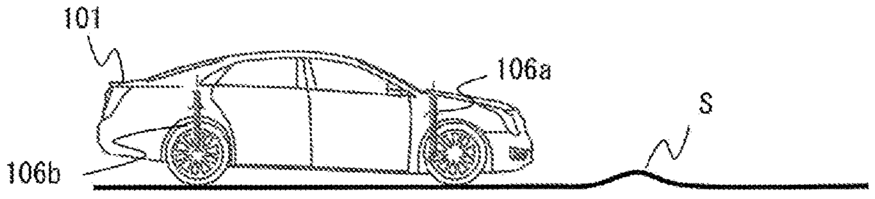
FIGS. 1(A), 1(B), and 1(C) are views illustrating a vehicle equipped with a suspension control device.
Figure 1B:
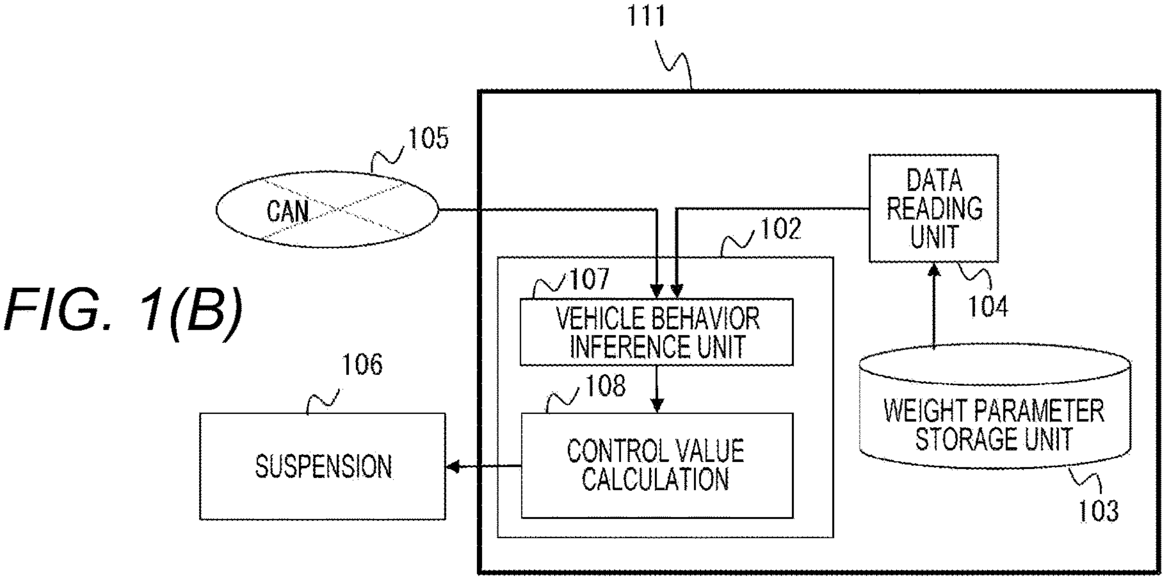
Figure 1C:
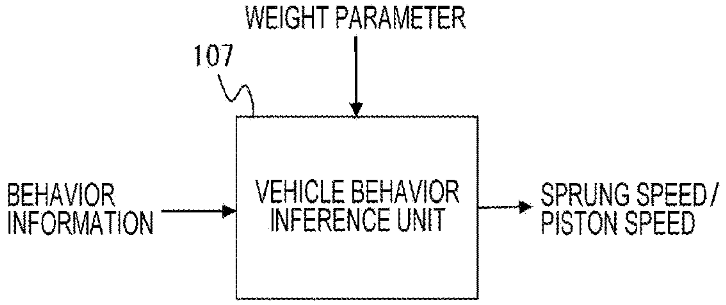

FIGS. 1(A), 1(B), and 1(C) are views illustrating a vehicle 101 equipped with a suspension control device 111 according to a first embodiment of the present invention. FIG. 1(A) is an external view of the vehicle 101, FIG. 1(B) is a block configuration diagram of the suspension control device 111, and FIG. 1(C) is a view illustrating a vehicle behavior inference unit 107.

As illustrated in FIG. 1(A), the vehicle 101 includes a suspension 106*a* of a front wheel and a suspension 106*b* of a rear wheel. By controlling the suspensions 106*a* and 106*b*, vibration transmitted from a road surface S to the vehicle 101 via the wheels during traveling is suppressed. Note that the suspensions 106*a* and 106*b* can control damping force characteristics, and the suspension control device 111 controls the damping force of the suspensions 106*a* and 106*b*.

As illustrated in FIG. 1(B), the suspension control device 111 includes a control unit 102, a weight parameter storage unit 103, and a data reading unit 104. The control unit 102 further includes a vehicle behavior inference unit 107 and a control value calculation unit 108.

The suspension control device 111 acquires data related to vehicle behavior during traveling (hereinafter, referred to as behavior information) from among communication data transmitted via a controller area network (CAN) 105 in the vehicle, calculates a suspension control value based on this behavior information and a weight parameter in the weight parameter storage unit 103, and controls the suspension 106 (106*a* and 106*b*).

Note that in the present embodiment, the CAN will be described as an example of an in-vehicle network, but other in-vehicle networks may be used. For example, CAN with Flexible Data rate (CAN FD), FlexRay, in-vehicle Ethernet, and the like can similarly implement the in-vehicle network.

Next, damping force control of the suspension 106 performed by the suspension control device 111 will be described. The vehicle behavior inference unit 107 in the control unit 102 reads, via the data reading unit 104, a weight parameter stored in the weight parameter storage unit 103. Furthermore, based on the behavior information and the weight parameter arriving from the CAN 105, the vehicle behavior inference unit 107 infers data related to the suspension control necessary for the control value calculation unit 108, specifically, an instantaneous value related to the suspension control. The control value calculation unit 108 calculates a suspension control value for controlling the damping force of the suspension 106 based on the instantaneous value input from the vehicle behavior inference unit 107.

Here, a comparative example to be compared with the present embodiment will be described. In this comparative example, an acceleration sensor is installed in the suspension 106 equipped for each of the four wheels of the vehicle, a vertical speed on a spring (hereinafter, referred to as sprung speed) and a stroke speed of a piston (hereinafter, referred to as piston speed) are measured, and the suspension is controlled based on this measurement result. Therefore, the acceleration sensor needs to be installed for each of the four wheels of the vehicle, and the cost increases due to an increase in components such as a bracket and a harness for installation, an increase in the number of assembling man-hours, and the like. It is not possible to perform suspension control reflecting rigidity characteristics of the entire vehicle including many components.

On the other hand, in the present embodiment, the acceleration sensor is not installed in the suspensions 106 equipped for each of the four wheels of the vehicle 101. In the present embodiment, the vehicle behavior inference unit 107 infers data (sprung speed and piston speed) related to suspension control for each of the four wheels with reference to behavior information, for example, a wheel speed, front-rear acceleration, left-right acceleration, a yaw rate, and the like in data constantly transmitted to the CAN 105. Then, this inference result is transferred to the control value calculation unit 108 in a subsequent stage. This eliminates the need for installing the acceleration sensor, and can reduce the cost. Furthermore, the vehicle behavior inference unit 107 infers sensor data related to suspension control for each of the four wheels, and the vehicle behavior inference unit 107 is configured by, for example, a neural network. A weight parameter determined in advance for the vehicle 101 by machine learning is used in the neural network, and therefore the accuracy of suspension control according to the behavior of the vehicle 101 is improved by reflecting the rigidity characteristics of the entire vehicle.

As illustrated in FIG. 1(C), a weight parameter and behavior information are input to the vehicle behavior inference unit 107. Then, the vehicle behavior inference unit 107 infers, and outputs an instantaneous value, for example, sensor data such as sprung speed and piston speed based on the weight parameter and the behavior information.

Figure 2:
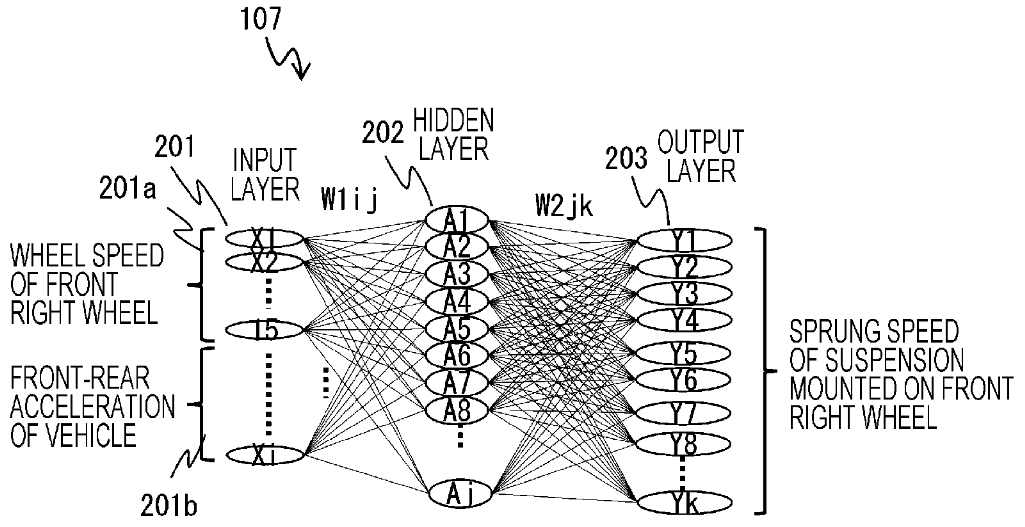
FIG. 2 is a view illustrating an example of a vehicle behavior inference unit.

FIG. 2 is a view illustrating an example of the vehicle behavior inference unit 107.

As illustrated in FIG. 2, in this example, the vehicle behavior inference unit 107 is configured by a neural network. The neural network includes a hierarchical neural network having a three-layer configuration in which elements of an input layer (the number of elements i) 201, a hidden layer (the number of elements j) 202, and an output layer (the number of elements K) 203 are hierarchically coupled. Each element of the input layer 201 and each element of the hidden layer 202 are coupled with a weight W1ij (i=1 to I, j=1 to J), and each element of the hidden layer 202 and each element of the output layer 203 are coupled with a weight W2jk (j=1 to J, k=1). The weight information (hereinafter, referred to as a weight parameter) is expressed by a determinant of the weight W1ij and the weight W2jk. As details described later, the weight parameter obtained in advance by machine learning and stored in the weight parameter storage unit 103 is used. Note that this example illustrates an all-element connection neural network in which the hidden layer 202 is one layer, which is the simplest, but the neural network is not limited to this.

As illustrated in FIG. 2, the input layer 201 of the neural network includes an input layer 201*a* to which time-series data of the wheel speed of the front right wheel is input and an input layer 201*b* to which time-series data of the front-rear acceleration of the vehicle 101 is input. To the output layer 203, an instantaneous value of the sprung speed of the suspension assumed to be mounted on the front right wheel of the vehicle 101 is output. The number of elements of the hidden layer 202 is generally determined from the numbers of elements of the input layer 201 and the output layer 203, and is a number that maximizes the accuracy of vehicle behavior inference by the neural network. The number of elements of the output layer 203 is determined by the output specification of vehicle behavior inference.

A case where the number of elements of the output layer 203 is 256 as the output specification will be described. For example, the sprung speed inferred as vehicle behavior is an analog instantaneous value, but the output of the neural network is 1 or 0, and thus needs to be expressed digitally. Therefore, a divided value in which the value range of the analog instantaneous value is divided into a plurality of levels and the output of the neural network are associated with each other in a one-to-one relationship. For example, assuming that the value range of the instantaneous value is −1.00 to 1.00, the range between them is expressed in 256 levels as 0.007843 (={1.00−(−1.00)}/255) per level. Here, an output Y1 of the neural network is assigned to 1.000000, and Y2 is associated with 0.992157, Y3 is associated with 0.984312, . . . , and Y256 is associated with −1.000000 in order. Then, only the output element corresponding to the instantaneous value is “1” (high), and the other elements are “0” (low). This enables an instantaneous value to be expressed with the output layer 203 of the neural network. Note that this example describes a case where the number of elements of the output layer 203 is 256, but the number of elements is not limited to this.

When the vehicle behavior inference unit 107 is configured by a neural network, behavior information arriving the CAN 105 is input to the neural network. Specifically, data are acquired at a constant sampling rate for behavior information arriving in time series from the CAN 105, and one data set is defined by a window 310 having a predetermined time width (see FIG. 3(B) described later). As an example, assuming that the sampling interval is every 20 msec and the window width is 1 sec, one data set for a certain physical quantity includes 50 points (=1 sec/20 msec), and the 50 points are assigned to 50 neural network input elements. Then, by shifting the window width in the time direction, the input of the neural network is updated. In FIG. 2, since two types of physical quantities of the wheel speed of the front right wheel and the front-rear acceleration of the vehicle 101 are input, the input element of the neural network is i=100 points (=50 points×2 types of physical quantities).

While FIG. 2 illustrates the neural network for controlling the suspension 106 mounted to the front right wheel of the vehicle 101 in order to simplify the description, the vehicle behavior inference unit 107 includes, corresponding to the four wheels of the vehicle 101, a neural network having a similar configuration.

Figure 3A:
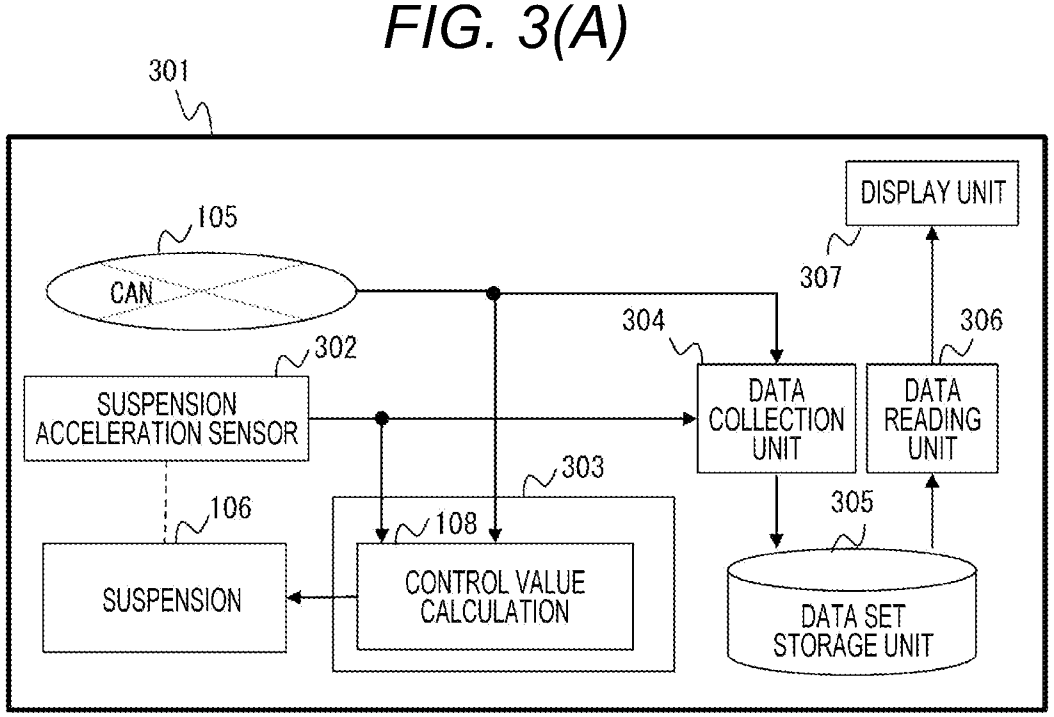
FIGS. 3(A) and 3(B) are a block configuration diagram of a data acquisition vehicle and a view illustrating an example of data.
Figure 3B:

FIGS. 3(A) and 3(B) are the block configuration diagram of a data acquisition vehicle 301 and a view illustrating an example of data.

The data acquisition vehicle 301 is a vehicle for acquiring in advance a correspondence relationship between behavior information transmitted to the CAN 105 and sensor data. Therefore, the data acquisition vehicle 301 has a suspension acceleration sensor 302 installed on the suspension 106 to acquire the sprung speed and the piston speed.

As illustrated in FIG. 3(A), the data acquisition vehicle 301 includes the suspension acceleration sensor 302, a control unit 303, a data collection unit 304, a data set storage unit 305, a data reading unit 306, and a display unit 307. The control unit 303 includes the control value calculation unit 108. The CAN 105 and the suspension 106 are similar to those described with reference to FIG. 1(B).

The control value calculation unit 108 of the control unit 303 calculates the suspension control value of the damping force of the suspension 106 based on the instantaneous value output from the suspension acceleration sensor 302. The data collection unit 304 acquires the behavior information transmitted to the CAN 105 and the sensor data output from the suspension acceleration sensor 302, and stores, as a data set, those information in association with each other in the data set storage unit 305. The display unit 307 visualizes as needed and displays the data set stored in the data set storage unit 305 via the data reading unit 306. Note that although an example in which the display unit 307 is provided in the data acquisition vehicle 301 is illustrated, the display unit may be installed outside the vehicle such as a server device via a network.

FIG. 3(B) is an example of a data set acquired by the data acquisition vehicle 301. The upper part of the figure illustrates a wheel speed as an example of the behavior information transmitted to the CAN 105, and the lower part of the figure illustrates a piston speed as an example of the instantaneous value output from the suspension acceleration sensor 302. The horizontal axes represent time.

As illustrated in FIG. 3(B), the wheel speed transmitted to the CAN 105 is associated with the piston speed output from the suspension acceleration sensor 302. For example, the wheel speed indicated by the window 310 is associated with an instantaneous value 311 output from the suspension acceleration sensor 302.

Behavior information indicating the behavior of the vehicle and sensor data related to the suspension of the vehicle may be acquired not only by the data acquisition vehicle 301 but also by using an acquisition device such as a simulation imitating the data acquisition vehicle 301. Also in this case, the acquisition device may display the behavior information and the acquired sensor data on the display unit in association with each other.

Figure 4:
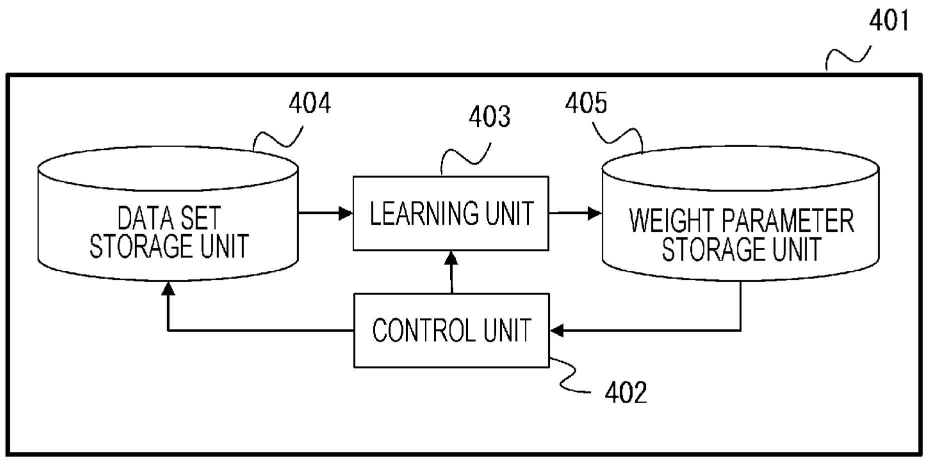
FIG. 4 is a block configuration diagram of a learning device.

FIG. 4 is a block configuration diagram of a learning device 401.

The learning device 401 includes a control unit 402, a learning unit 403, a data set storage unit 404, and a weight parameter storage unit 405.

The data set storage unit 404 stores a data set acquired by the data acquisition vehicle 301 illustrated in FIG. 3. Specifically, the data set stored in the data set storage unit 305 of the data acquisition vehicle 301 is transferred to the data set storage unit 404 of the learning device 401 via a network or the like.

The learning unit 403 reads the data set from the data set storage unit 404 according to an instruction to start learning of the control unit 402, and learns the correlation between the behavior information transmitted to the CAN 105 and the sensor data from the suspension acceleration sensor 302.

The learning unit 403 is configured by, for example, a neural network similar to that described with reference to FIG. 2. The machine learning by the neural network is performed using the behavior information stored in the data set storage unit 404 and the sensor data from the suspension acceleration sensor 302. Specifically, the behavior information transmitted to the CAN 105, for example, a discrete value obtained by sampling the data included in the window 310 illustrated in FIG. 3(B) is set in the element of the input layer (number of elements i) 201 of the neural network, and the instantaneous value 311 of the sensor data from the suspension acceleration sensor 302 corresponding to the discrete value is set in the element of the output layer (number of elements K) 203 of the neural network.

The relationship between the window 310 and the instantaneous value 311 of the sensor data will be described. In FIG. 3(B), the width of the window 310 is set to 1 second for easy understanding, but the instantaneous value 311 of the sensor data is set to a specification inferred from a travel history 1 second before that. Therefore, assuming that the sampling interval is, for example, 20 msec, the number of sampling points in the window 310 is 50 (=1 second/20 msec), a combination of the 50 data groups and the instantaneous value 311 of the sensor data is defined as a learning data set, and the data set is multiplied by n by sliding the window 310 and the instantaneous value 311 of the sensor data every 20 msec or every 20 msec×m (m: integer) in the time direction.

The weight parameter that is a result of the machine learning of the learning unit 403 configured by the neural network is stored in the weight parameter storage unit 405. This weight parameter indicates a correlation between the behavior information transmitted to the CAN 105 and the sensor data from the suspension acceleration sensor 302, that is, a correspondence. Then, the weight parameter stored in the weight parameter storage unit 405 is stored in the weight parameter storage unit 103 illustrated in FIG. 1(B) as appropriate. Then, as described above, in the vehicle 101 in which no acceleration sensor is installed in the suspension 106, the suspension is controlled by inferring the sprung speed and the piston speed.

Figure 5:
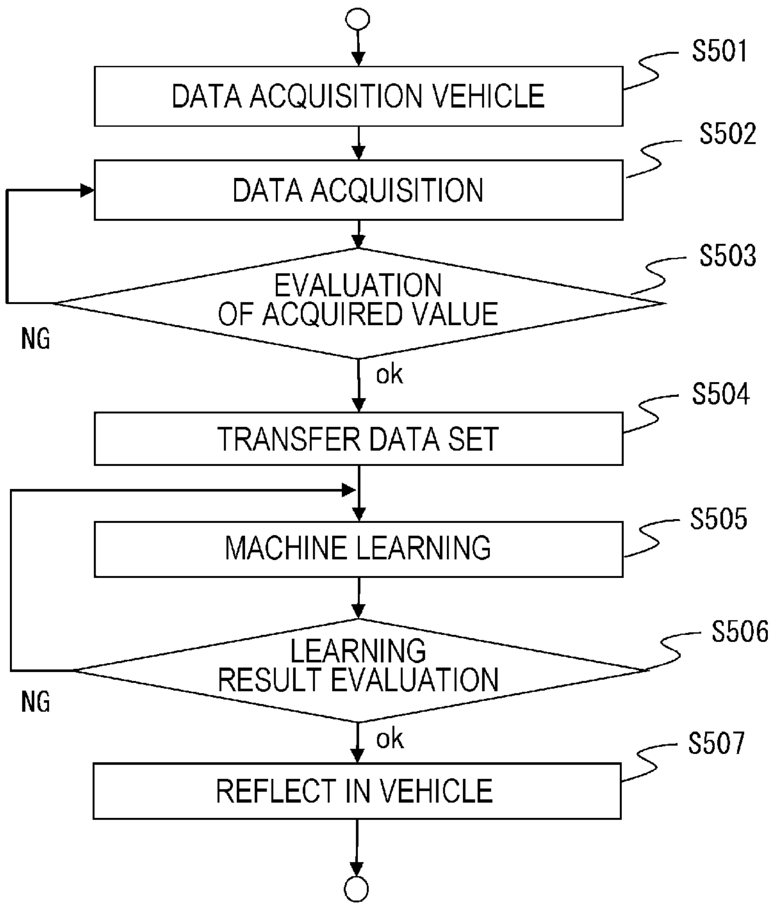
FIG. 5 is a flowchart showing processing until data is acquired and learned.

FIG. 5 is a flowchart showing the processing until data is acquired and learned.

In step S501, as described with reference to FIG. 3(A), data acquisition by the data acquisition vehicle 301 in which the suspension acceleration sensor 302 is installed in the suspension 106 is started.

In step S502, while the data acquisition vehicle 301 is traveling, the behavior information transmitted to the CAN 105 and the sensor data of the suspension acceleration sensor 302 are acquired, and those information are stored, as a data set, in the data set storage unit 305 in association with each other. This is a data acquisition phase, where a data set for learning the neural network is acquired while the data acquisition vehicle 301 is actually tested on a travel path.

In step S503, it is determined whether the data set has an abnormal value such as exceeding an assumed range or being fixed to a constant value. This determination is performed by the control unit 303 of the data acquisition vehicle 301. In a case of an abnormal value, the data set is discarded and is not stored in the data set storage unit 305. Then, the process returns to step S502. If the data set does not have an abnormal value, the process proceeds to step S504.

In step S504, the data set stored in the data set storage unit 305 is transferred to the data set storage unit 404 of the learning device 401.

In the next step S505, as described with reference to FIG. 4, the learning device 401 performs machine learning of the correlation between the behavior information transmitted to the CAN 105 and the sensor data from the suspension acceleration sensor 302. This is a learning phase, where learning of the neural network is performed using the data set acquired in the data acquisition phase.

Note that since a calculation resource is required for learning, the learning device 401 is a server device, a personal computer, or the like. The time-series data in the window 310 (see FIG. 3(B)) is set in the input element of the neural network constituting the learning unit 403, and the instantaneous value that is sensor data from the suspension acceleration sensor 302 is set in the output element of the neural network. In this state, the weight parameter of the neural network that minimizes the output error is determined by learning using, for example, an error back-propagation method.

In the next step S506, the learning device 401 compares the learning result with, for example, an expected value, and determines whether or not an error from the expected value has become sufficiently small. Machine learning is performed until the error becomes sufficiently small. When it is determined that the error has become sufficiently small, the process proceeds to step S507, and the weight parameter of the learning result is reflected in the vehicle 101 illustrated in FIG. 1(A). Specifically, the weight parameter of the learned result is transferred to the weight parameter storage unit 103.

Thereafter, suspension control becomes possible in the vehicle 101. That is, in the vehicle 101, the behavior information arriving from the CAN 105 is input to the input element of the neural network in which the learned weight parameter is set, and the value of the output element is derived by calculation of the value of the input element and the weight parameter, thereby obtaining the instantaneous value corresponding to the acceleration sensor.

Figure 6:
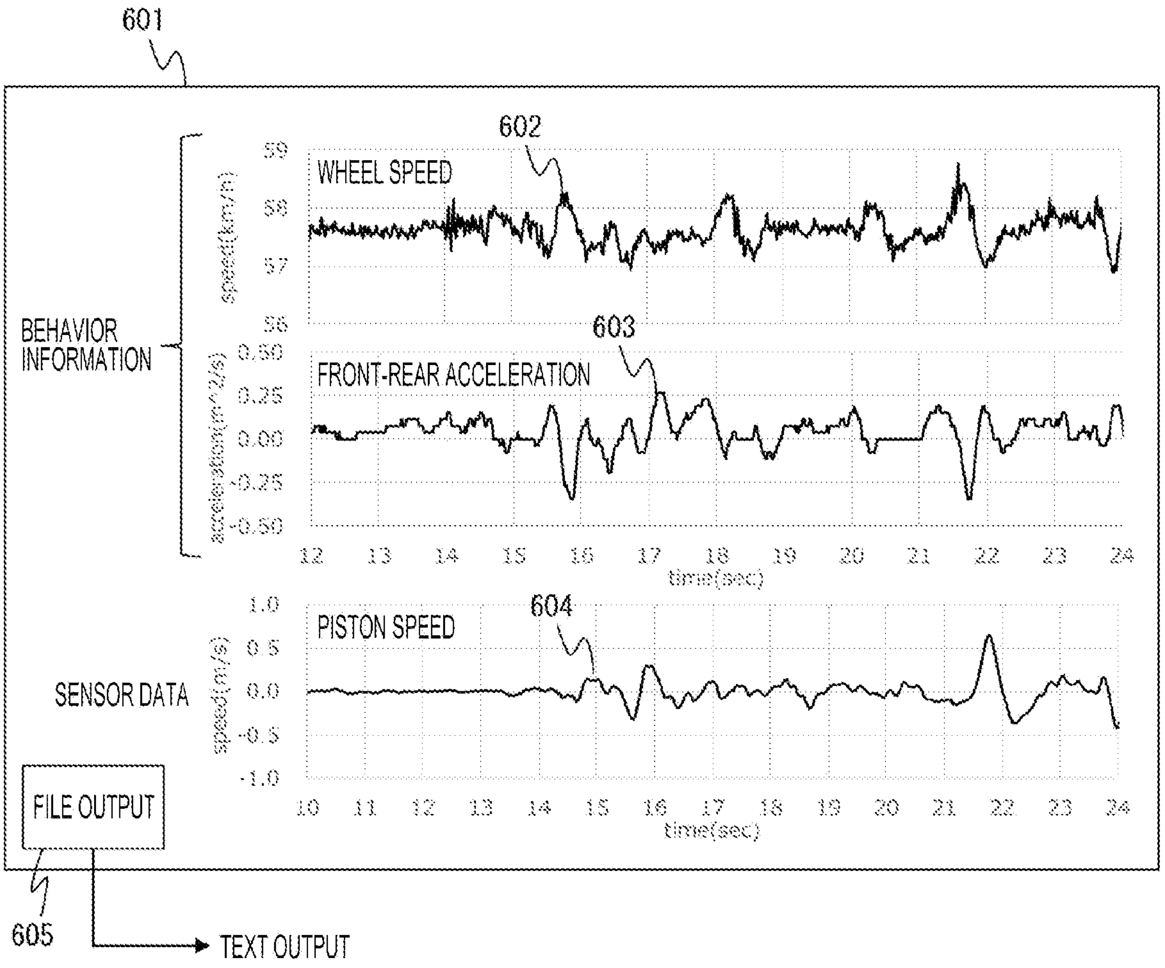
FIG. 6 is an example of a display screen of behavior information and sensor data.

FIG. 6 is an example of a display screen 601 for behavior information and sensor data.

This display screen 601 indicates data displayed on the display unit 307 illustrated in FIG. 3, and is displayed in step S502 shown in FIG. 5.

In the data acquisition by the data acquisition vehicle 301, various data are acquired by traveling on various road surfaces as much as possible in a limited time. Therefore, it is desirable that whether valid data has been acquired can be appropriately checked with the display screen 601 in real time.

FIG. 6 illustrates an example in which the upper part of the display screen 601 displays wheel speed 602 and front-rear acceleration 603, which are behavior information transmitted to the CAN 105. The lower part of the display screen 601 indicates an example in which time-series data of piston speed 604 of the suspension acceleration sensor 302 is displayed. As described in step S503 of FIG. 5, the control unit 303 of the data acquisition vehicle 301 determines whether the data set has an abnormal value such as exceeding an assumed range or being fixed to a constant value. At this time, if the data set has an abnormal value, the control unit 303 displays, on the display screen 601, identification information indicating that the data set has an abnormal value or performs notification by voice or the like using a notification device not illustrated.

The data set is output in text for input to the neural network. A button 605 is a button for instructing start of text output. When an instruct is given with this button 605, the control unit 303 of the data acquisition vehicle 301 outputs a data set in a csv format file, for example. Note that the button 605 may be a physical button, may be selected by a touch operation, or may be selected by a pointing device or the like.

Figure 7:
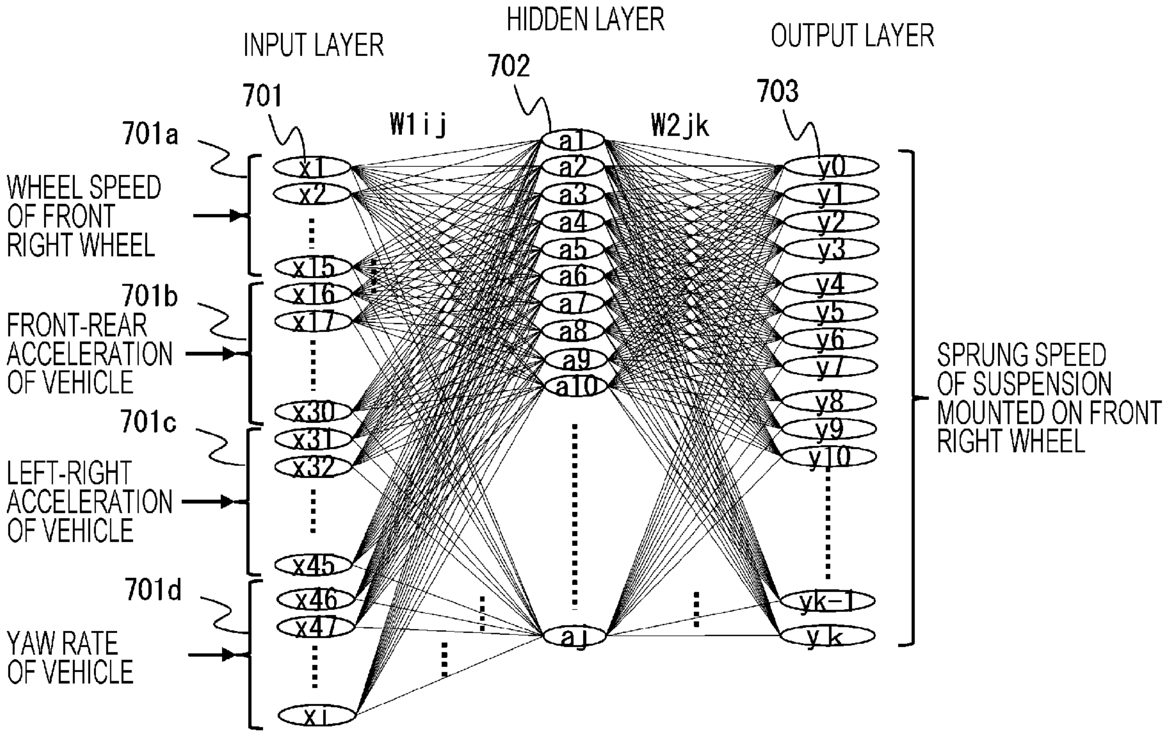
FIG. 7 is a view illustrating Modification 1 of the vehicle behavior inference unit.

FIG. 7 is a view illustrating Modification 1 of the vehicle behavior inference unit 107.

Modification 1 illustrates an example in which the vehicle behavior inference unit 107 is configured by a neural network.

As illustrated in FIG. 7, the input layer 701 includes an input layer 701*a* to which time-series data of the wheel speed of the front right wheel is input, an input layer 701*b* to which time-series data of the front-rear acceleration of the vehicle 101 is input, an input layer 701*c* to which time-series data of the left-right acceleration of the vehicle 101 is input, and an input layer 701*d* to which time-series data of the yaw rate of the vehicle 101 is input. Since a hidden layer 702 and an output layer 703 are similar to those in FIG. 2, the description thereof will be omitted.

In Modification 1, since four types of physical quantities of the wheel speed of the front right wheel, the front-rear acceleration of the vehicle 101, the left-right acceleration of the vehicle 101, and the yaw rate of the vehicle 101 are input as the time-series data, the input element of the neural network is i=200 points (=50 points×4 types of physical quantities).

While FIG. 7 illustrates the neural network for controlling the suspension 106 mounted to the front right wheel of the vehicle 101 in order to simplify the description, the vehicle behavior inference unit 107 includes, corresponding to the four wheels of the vehicle 101, a neural network having a similar configuration.

Figure 8A:
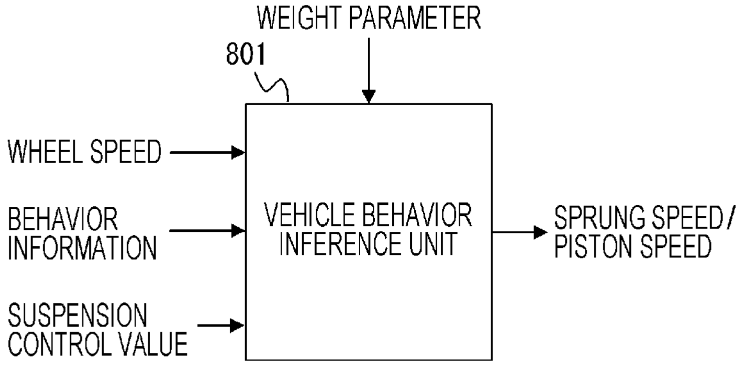
FIGS. 8(A), 8(B), and 8(C) are views illustrating Modification 2, 3, and 4 of the vehicle behavior inference unit.
Figure 8B:
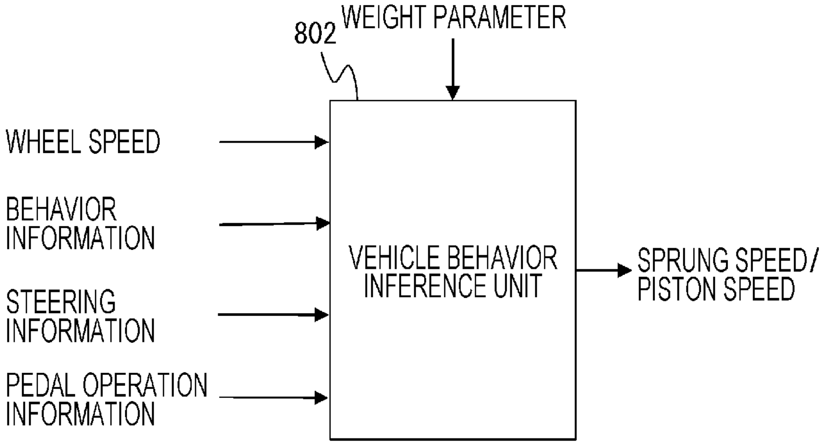
Figure 8C:
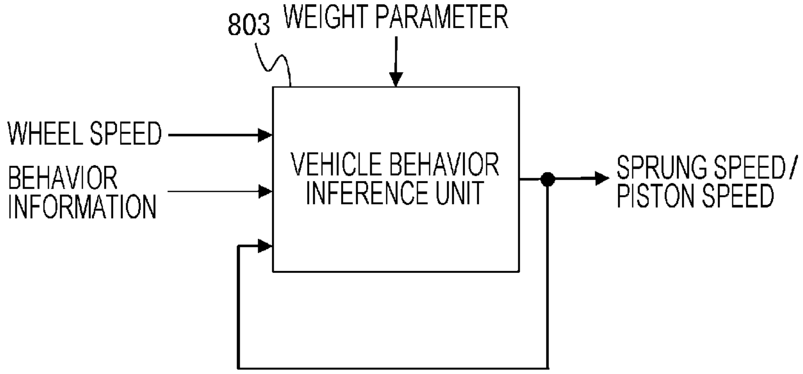

FIGS. 8(A), 8(B), and 8(C) are views illustrating Modifications 2, 3, and 4 of the vehicle behavior inference unit 107.

As illustrated in FIG. 8(A), a vehicle behavior inference unit 801 receives a wheel speed and other behavior information from communication data constantly transmitted to the CAN 105 and a suspension control value output from the control value calculation unit 108 at a subsequent stage of the vehicle behavior inference unit 801. The control value calculation unit 108 outputs a suitable suspension control value according to the vehicle behavior, and the suspension control value also includes a tendency regarding the vehicle behavior. Focusing on this, the suspension control value is added to the input of the vehicle behavior inference unit 801, and the inference accuracy of the data related to the suspension control, for example, the sensor data is improved.

As illustrated in FIG. 8(B), a vehicle behavior inference unit 802 receives a wheel speed and other behavior information from communication data constantly transmitted to the CAN 105, steering information of the steering wheel, and pedal operation information of the accelerator and the brake. Since the front-rear acceleration of the vehicle 101 can be inferred by the steering information and the pedal operation information, the inference accuracy of the sensor data related to the suspension control is improved by using these information as input of the vehicle behavior inference unit 802.

As illustrated in FIG. 8(C), a vehicle behavior inference unit 803 receives a wheel speed and other behavior information from communication data constantly transmitted to the CAN 105, and the sprung speed or the piston speed output one generation before, that is, immediately before by the vehicle behavior inference unit 803. The sprung speed or the piston speed is data related to suspension control, is a value indicating a continuous change in instantaneous value, and is affected by an immediately preceding instantaneous value. Therefore, by referring to the instantaneous value output from the vehicle behavior inference unit 803 immediately before in addition to the communication data input from the CAN 105, the inference accuracy of the sensor data related to the suspension control is improved.

Figure 9A:
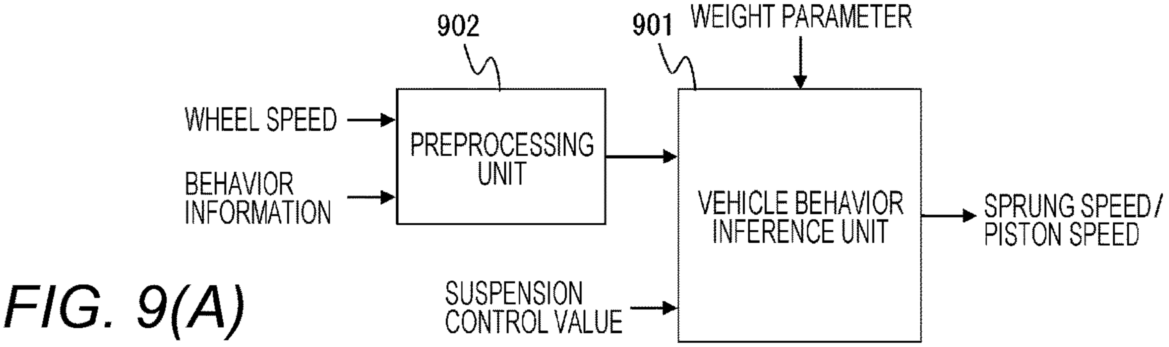
FIGS. 9(A) and 9(B) are views illustrating Modification 5 of the vehicle behavior inference unit.
Figure 9B:
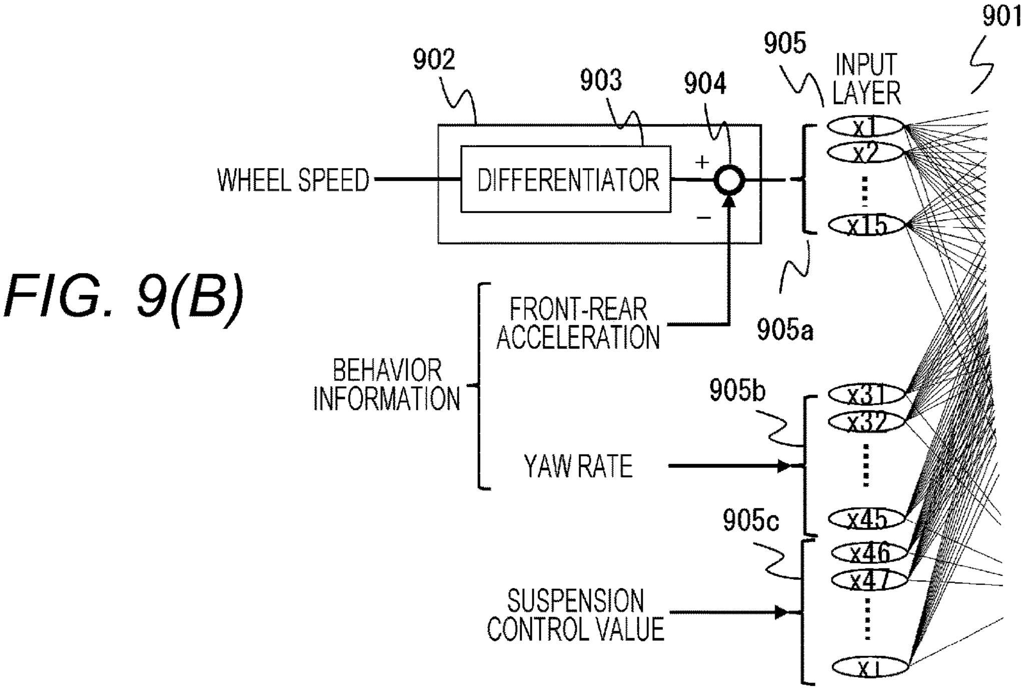

FIGS. 9(A) and 9(B) are views illustrating Modification 5 of the vehicle behavior inference unit 107.

As illustrated in FIG. 9(A), behavior information arriving from the CAN 105 is not directly input to a vehicle behavior inference unit 901, but is input to a preprocessing unit 902 in a preceding stage. The preprocessing unit 902 puts a plurality of pieces of behavior information into one piece of behavior information. For example, wheel speed is put together with other behavior information, and the wheel speed having been put together is input to the vehicle behavior inference unit 901. As described later, the number of input terminals of the vehicle behavior inference unit 901 can be reduced by the preprocessing unit 902. In a case where the vehicle behavior inference unit 901 is implemented by a neural network, a large amount of matrix calculation will be performed, and thus it is possible to reduce the calculation resource required by the in-vehicle control unit 102.

FIG. 9(B) is a view illustrating an example of the preprocessing unit 902 illustrated in FIG. 9(A).

The preprocessing unit 902 includes a differentiator 903 and an adder/subtractor 904. The wheel speed arriving from the CAN 105 is converted into wheel acceleration by the differentiator 903. Then, the adder/subtractor 904 performs addition/subtraction of the wheel acceleration and the front-rear acceleration between acceleration values. This makes it possible to generate the wheel acceleration after the wheel acceleration and the front-rear acceleration are put together, and the front-rear acceleration itself does not need to be input to the neural network. This enables the input layer for front-rear acceleration to be omitted, and as a result, can reduce the network scale of the neural network. In the example illustrated in FIG. 9(B), an input layer 905 of the neural network includes an input layer 905*a* to which the wheel acceleration is input, an input layer 905*b* to which the yaw rate is input, and an input layer 905*c* to which the suspension control value of one generation before is input.

FIG. 9(B) illustrates an example in which the circuit scale of the neural network is reduced using the front-rear acceleration, but the preprocessing may be performed using the left-right acceleration, the yaw rate, or other behavior information.

Figure 10:
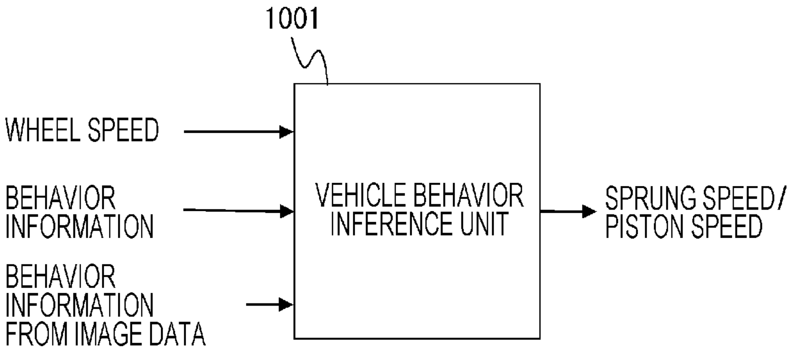
FIG. 10 is a view illustrating Modification 6 of the vehicle behavior inference unit.

FIG. 10 is a view illustrating Modification 6 of the vehicle behavior inference unit 107.

As illustrated in FIG. 10, a vehicle behavior inference unit 1001 not only receives a wheel speed and other behavior information from communication data constantly transmitted to the CAN 105 but also receives behavior information based on image data of a stereo camera or the like that is being generally equipped by automatic drive or an automatic drive assist system. The behavior information based on the image data is, for example, information obtained by detecting up and down, front and rear, and left and right behavior of the vehicle 101 in image comparison for each frame. This can increase the accuracy of inference of the vehicle behavior, and can infer the sensor data related to the suspension control red based on the inference.

According to the first embodiment, use of the behavior information transmitted to the CAN 105 enables control of the suspension in a vehicle in which the acceleration sensor is not installed in the suspension 106. The data set related to the behavior information and the suspension control is acquired by traveling the vehicle 101, and the weight parameter is determined by machine learning based on the data set including the rigidity characteristics of the entire vehicle including many components, and therefore the accuracy of the suspension control according to the behavior of the vehicle 101 is improved.

Second Embodiment

Figure 11:
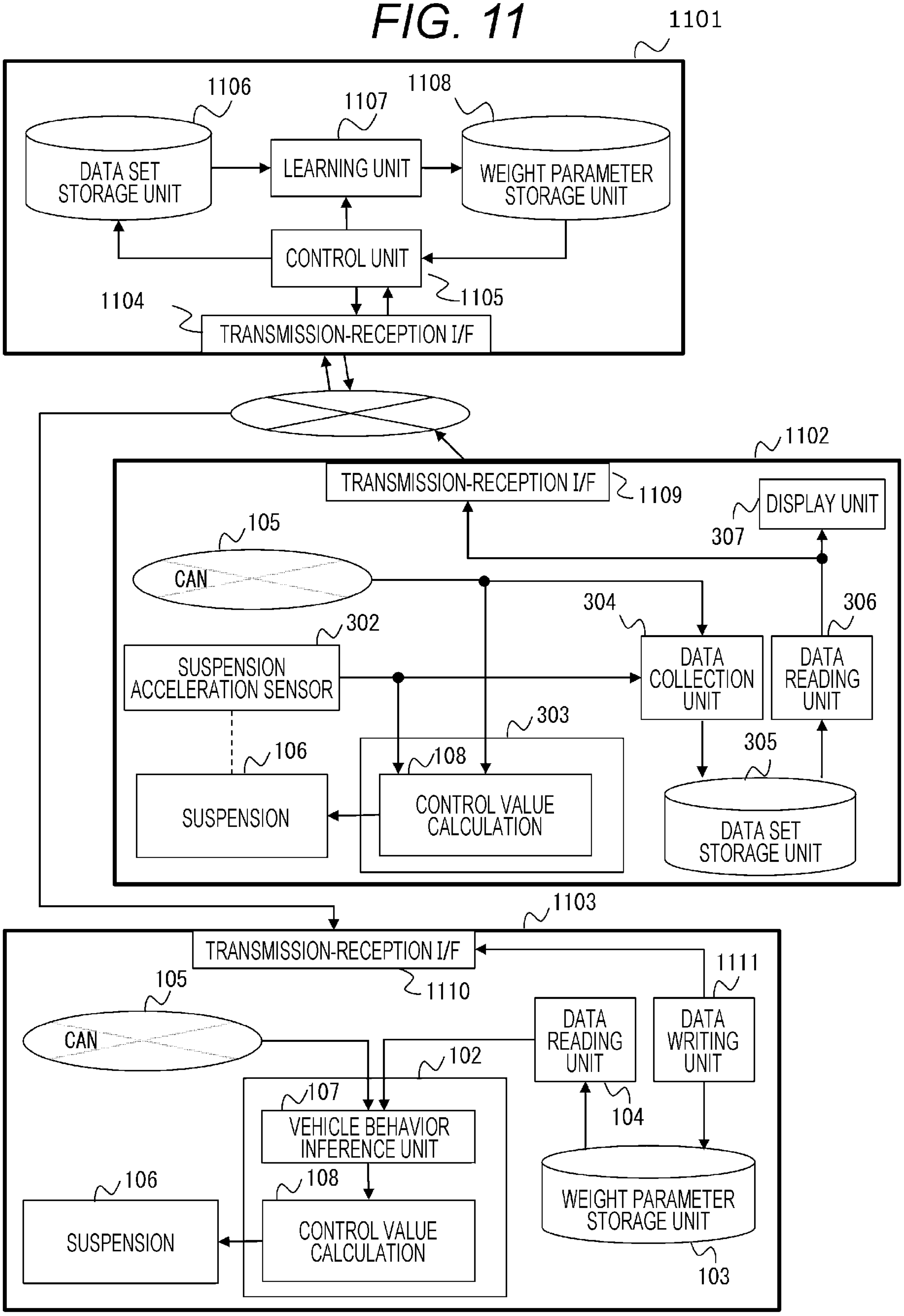
FIG. 11 is a block configuration diagram of a suspension control system.

FIG. 11 is a block configuration diagram of a suspension control system.

The suspension control system includes a server device 1101, a data acquisition vehicle 1102, and a traveling vehicle 1103.

The server device 1101 includes a transmission-reception interface 1104, a control unit 1105, a learning unit 1107, a data set storage unit 1106, and a weight parameter storage unit 1108. The configuration of the server device 1101 except the transmission-reception interface 1104 is similar to that of the learning device 401 described with reference to FIG. 4 in the first embodiment.

The data acquisition vehicle 1102 includes the suspension 106, the suspension acceleration sensor 302, the control unit 303, the data collection unit 304, the data set storage unit 305, the data reading unit 306, the display unit 307, and a transmission-reception interface 1109. The control unit 303 further includes the control value calculation unit 108. The configuration of the data acquisition vehicle 1102 except the transmission-reception interface 1109 is similar to that of the data acquisition vehicle 301 described with reference to FIG. 3 in the first embodiment.

The traveling vehicle 1103 includes the control unit 102, the weight parameter storage unit 103, the data reading unit 104, the CAN 105, the suspension 106, a transmission-reception interface 1110, and a data writing unit 1111. The control unit 102 further includes the vehicle behavior inference unit 107 and the control value calculation unit 108. The traveling vehicle 1103 corresponds to the vehicle 101 described with reference to FIG. 1 in the first embodiment.

While traveling the data acquisition vehicle 1102, the data acquisition vehicle 1102 acquires the behavior information transmitted to the CAN 105 and the sensor data of the suspension acceleration sensor 302, and stores, as a data set, those information in the data set storage unit 305 in association with each other. Then, the data set stored in the data set storage unit 305 is transferred to the server device 1101 via the transmission-reception interface 1109.

Note that the data set stored in the data set storage unit 305 via the data reading unit 306 may be visualized as needed and displayed as needed onto the display unit 307 of the data acquisition vehicle 1102. Then, as described with reference to FIG. 6, when an instruct is given with this button 605, a data set is output in a csv format file, for example.

The server device 1101 receives the data set from the data acquisition vehicle 1102 via the transmission-reception interface 1104 from a wide area network. Then, the received data set is stored in the data set storage unit 1106 by the control unit 1105. The learning unit 1107 reads the data set from the data set storage unit 1106 according to an instruction to start learning of the control unit 1105, and performs machine learning of a correlation between the behavior information transmitted to the CAN 105 and the sensor data from the suspension acceleration sensor 302 using the behavior information of the data acquisition vehicle 1102 represented by the data set and the sensor data. The weight parameter of the learned result is stored in the weight parameter storage unit 1108.

The traveling vehicle 1103 acquires the weight parameter stored in the weight parameter storage unit 1108 of the server device 1101 from the transmission-reception interface 1110 via the wide area network, and the data writing unit 1111 writes the acquired weight parameter into the weight parameter storage unit 103. The control unit 102, which is a suspension control device, includes the vehicle behavior inference unit 107. The vehicle behavior inference unit 107 is configured by a neural network, and reflects a learning result by the learning unit 1107 of the server device 1101 by reading the weight parameter via the data reading unit 104. The control unit 102 performs control of the suspension 106 based on the reflected learning result.

According to the present embodiment, in addition to the effects described in the first embodiment, the weight parameters acquired by one data acquisition vehicle 1102 can be reflected in a plurality of the traveling vehicles 1103 as long as the vehicles are of the same vehicle type. The data acquisition vehicle 1102 continuously acquires a data set, and the server device 1101 performs, as needed, machine learning on the acquired data set, whereby the weight parameter of the traveling vehicle 1103 can be updated, and highly accurate suspension control reflecting the characteristics of the vehicle can be performed.

According to the embodiments described above, the following operational effects can be obtained.

(1) The suspension control device 111 includes the parameter storage unit 103 that stores a parameter indicating a correspondence between behavior information indicating behavior of the vehicle 101 and sensor data related to the suspension 106 of the vehicle 101, the parameter determined in advance by machine learning; the vehicle behavior inference unit 107 that receives the behavior information among communication data transmitted in the vehicle 101 and infers the sensor data related to the suspension 106 of the vehicle 101 based on the behavior information and the parameter in the parameter storage unit 103; and the control value calculation unit 108 that calculates a suspension control value for controlling the suspension 106 based on the inferred sensor data. This improves the accuracy of the suspension control according to the behavior of the vehicle.

(2) The suspension control method is a suspension control method in the suspension control device 111 that controls the suspension 106 of the vehicle 101, the suspension control method including: storing a parameter indicating a correspondence between behavior information indicating behavior of the vehicle 101 and sensor data related to the suspension 106 of the vehicle 101, the parameter determined in advance by machine learning; receiving the behavior information among communication data transmitted in the vehicle 101 and inferring the sensor data related to the suspension 106 of the vehicle 101 based on the behavior information and the parameter; and calculating a suspension control value for controlling the suspension 106 based on the inferred sensor data. This improves the accuracy of the suspension control according to the behavior of the vehicle.

(3) The suspension control system is a suspension control system including the server device 1101 and the suspension control device 102 that controls the suspension 106 of the vehicle 1103, the suspension control system, in which the server device 1101 acquires behavior information indicating behavior of the vehicle 1103 and sensor data related to the suspension 106 of the vehicle 1103, and determines, by machine learning, a parameter indicating a correspondence between the behavior information and the sensor data, and the suspension control device 102 acquires the parameter from the server device 1101, receives the behavior information among communication data transmitted in the vehicle 1103, infers the sensor data related to the suspension 106 of the vehicle 1103 based on the behavior information and the parameter, and controls the suspension 106 based on the inferred sensor data. This improves the accuracy of the suspension control according to the behavior of the vehicle.

The present invention is not limited to the above-described embodiments, and other forms conceivable within the scope of the technical idea of the present invention are also included within the scope of the present invention as long as the features of the present invention are not impaired. The above-described embodiments and a plurality of modifications may be combined.

REFERENCE SIGNS LIST

101 vehicle
102, 303, 402 control unit
103, 401, 405, 1108 weight parameter storage unit
104 data reading unit
105 CAN
106 suspension
107, 801, 802, 803, 901, 1001 vehicle behavior inference unit
108 control value calculation unit
111 suspension control device
201, 905 input layer
202 hidden layer
203 output layer
301 data acquisition vehicle
302 suspension acceleration sensor
304 data collection unit
305, 404 data set storage unit
306 data reading unit
307 display unit
401 learning device
403, 1107 learning unit
605 button
902 preprocessing unit
903 differentiator
904 adder/subtractor
1101 server device
1102 data acquisition vehicle
1103 traveling vehicle
1104, 1109, 1110 transmission-reception interface
1105 control unit
1106 data set storage unit
1111 data writing unit

The invention claimed is:

1. A suspension control device, comprising:
a parameter storage unit that stores a weight parameter indicating a correspondence between behavior information indicating behavior of a vehicle, including at least rotational wheel speeds and a front-rear acceleration of the vehicle, and sensor data corresponding to piston speed and sprung speed related to each of suspensions of a plurality of wheels provided in the vehicle, the weight parameter determined in advance by machine learning;
a vehicle behavior inference unit that includes a neural network that receives the behavior information among communication data transmitted in the vehicle and infers the sensor data related to the suspension of the vehicle for each of the suspensions based on the behavior information and the weight parameter in the parameter storage unit; and
a control value calculation unit that calculates a suspension control value for controlling the suspension based on the inferred sensor data;
wherein the vehicle behavior inference unit controls a suspension of the vehicle based on the suspension control value.

2. The suspension control device according to claim 1, wherein the vehicle behavior inference unit includes a neural network, and the neural network infers the sensor data using the behavior information and the weight parameter.

3. The suspension control device according to claim 1, wherein the communication data is data to be transmitted to an in-vehicle network of the vehicle.

4. The suspension control device according to claim 1, wherein the behavior information is at least one of rotational wheel speed, front-rear acceleration, left-right acceleration, and a yaw rate of the vehicle.

5. The suspension control device according to claim 4, wherein the behavior information further includes sensor data inferred in past by the vehicle behavior inference unit.

6. The suspension control device according to claim 4, comprising
a preprocessing unit that puts a plurality of pieces of behavior information input to the vehicle behavior inference unit into one piece of behavior information.

7. The suspension control device according to claim 1, wherein the sensor data inferred by the vehicle behavior inference unit corresponds to sensor data of a sensor that detects piston speed and sprung speed of a suspension device of four wheels of the vehicle.

8. A suspension control system, comprising:
the suspension control device according to claim 1; and
an acquisition device that acquires behavior information indicating behavior of the vehicle and sensor data related to a suspension of the vehicle,
wherein the acquisition device displays the behavior information and the acquired sensor data.

9. A suspension control method in a suspension control device that controls a suspension of a vehicle, the suspension control method, comprising:
storing a weight parameter indicating a correspondence between behavior information indicating behavior of a vehicle, including at least rotational wheel speeds and a front-rear acceleration of the vehicle, and sensor data corresponding to piston speed and sprung speed related to each of suspensions of a plurality of wheels provided in the vehicle, the weight parameter determined in advance by machine learning;
receiving by a vehicle behavior inference unit that includes a neural network the behavior information among communication data transmitted in the vehicle and inferring the sensor data related to the suspension of the vehicle for each of the suspensions based on the behavior information and the weight parameter; and
calculating a suspension control value for controlling the suspension based on the inferred sensor data; and controlling a suspension of the vehicle based on the suspension control value.

10. The suspension control method according to claim 9, wherein the sensor data is inferred using the behavior information and the weight parameter by a neural network.

11. A suspension control system including a server device and a suspension control device that controls a suspension of a vehicle, wherein the server device acquires behavior information indicating behavior of the vehicle, including at least rotational wheel speeds and a front-rear acceleration of the vehicle, and sensor data corresponding to piston speed and sprung speed related to each of suspensions of a plurality of wheels provided in the vehicle, and determines, by machine learning, a weight parameter indicating a correspondence between the behavior information and the sensor data, and the suspension control device includes a neural network that acquires the weight parameter from the server device, receives the behavior information among communication data transmitted in the vehicle, infers the sensor data related to the suspension of the vehicle for each of the suspensions based on the behavior information and the weight parameter, and controls the suspension based on the inferred sensor data.

12. The suspension control system according to claim 11, wherein the server device includes a first neural network, and the first neural network performs the machine learning of the weight parameter indicating a correspondence between the behavior information and the sensor data, and the suspension control device includes a second neural network, and the second neural network infers the sensor data using the weight parameter corresponding to the behavior information.

13. The suspension control system according to claim 11, comprising an acquisition device that acquires the behavior information indicating behavior of the vehicle and sensor data related to a suspension of the vehicle, wherein the acquisition device displays the behavior information and the acquired sensor data.

* * * * *